United States Patent
Sasanouchi et al.

(10) Patent No.: US 7,038,147 B2
(45) Date of Patent: May 2, 2006

(54) INPUT DEVICE AND AUTOMOBILE VEHICLE USING THE SAME

(75) Inventors: Kiyotaka Sasanouchi, Katano (JP); Rihito Shoji, Kadoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 233 days.

(21) Appl. No.: 10/820,267

(22) Filed: Apr. 8, 2004

(65) Prior Publication Data

US 2005/0077157 A1    Apr. 14, 2005

(30) Foreign Application Priority Data

Oct. 10, 2003   (JP) .............................. 2003-351998

(51) Int. Cl.
*H01H 9/00*   (2006.01)
(52) U.S. Cl. .................. 200/5 R; 200/61.54; 307/10.1
(58) Field of Classification Search ............... 200/5 R, 200/17 R, 18, 61.54; 307/9.1, 10.1; 345/161–163, 345/167, 184; 701/1, 36, 49
See application file for complete search history.

(56) References Cited

U.S. PATENT DOCUMENTS

| | | | |
|---|---|---|---|
| 6,225,578 B1 * | 5/2001 | Kobayashi et al. | 200/5 R |
| 6,441,510 B1 * | 8/2002 | Hein et al. | 307/10.1 |
| 6,593,667 B1 * | 7/2003 | Onodera et al. | 307/10.1 |
| 6,627,829 B1 * | 9/2003 | Sato | 200/5 R |
| 6,707,387 B1 * | 3/2004 | Noguchi et al. | 345/161 |
| 6,769,320 B1 * | 8/2004 | Bollgohn et al. | 73/866.3 |
| 6,812,942 B1 * | 11/2004 | Ribak | 701/211 |
| 6,882,267 B1 * | 4/2005 | Nagasaka | 307/10.1 |
| 6,903,288 B1 * | 6/2005 | Varga | 200/5 R |
| 6,961,644 B1 * | 11/2005 | Mercier et al. | 701/36 |

FOREIGN PATENT DOCUMENTS

| | | |
|---|---|---|
| EP | 1 228 917 A1 | 8/2002 |
| JP | 10-333764 A | 12/1998 |
| JP | 2003-054290 A | 2/2003 |

OTHER PUBLICATIONS

European Search Report for EP 04 00 8636, dated Mar. 24, 2005.

* cited by examiner

*Primary Examiner*—Michael A. Friedhofer
(74) *Attorney, Agent, or Firm*—RatnerPrestia

(57) ABSTRACT

Input device has a plurality of dials, a driving portion for moving the plurality of dials, a dial selecting portion and a controller. The dial selecting portion receives an input to make a selection from the plurality of dials. The controller controls the driving portion such that the dial selected by the input supplied to the dial selecting portion is moved to a predetermined position. By virtue of the described construction, a specific dial is moved to the position where it is easy to control. The input device is preferably mounted on a vehicle. A driver is enabled to select a dial desired to be controlled without the need for searching for it through the sense of sight and to control the dial easily.

18 Claims, 6 Drawing Sheets

US 7,038,147 B2

INPUT DEVICE AND AUTOMOBILE VEHICLE USING THE SAME

TECHNICAL FIELD

The present invention relates to an input device actuated without being looked at and an automobile vehicle using the input device.

BACKGROUND ART

For improvement of traffic safety and comfort in automobile driving, items of vehicle-mounted equipment are increasing in number. To be concrete, it can be mentioned that air conditioning and audio equipment have become standard and car navigation systems have come into widespread use. It is expected, in the near future, that installation on board of such equipment related to car communications as represented by telelmatics will become prevalent.

In line with such multifunctionalization of vehicle mounted equipment, there are disclosures of on-vehicle input equipment published, for example, in Japanese Patent Unexamined Publication Nos. 2003-54290 and H10-333764. An example of the same is shown in FIG. 8. Switch devices 8, 9 are each constructed of rotary dial knob (hereinafter called "knob") 12 incorporating a rotary encoder therein and display 13 disposed in the center thereof. Although it is not shown, switch devices 8, 9 each has a built-in tact switch.

When an item of vehicle-mounted equipment is to be controlled by one of switch devices 8, 9, knob 12 is pressed and thereby a tact switch is depressed so that functions of the switch devices are switched from one to another. FIG. 8 shows a state in which the function of air conditioner's temperature setting is switch-selected. When the function is switched over, display 13 displays the currently established function and the current set value. In FIG. 8, there are displayed "TEMP" representing the function of temperature setting and "25.0" indicating the set temperature. It is arranged such that the input function causes the temperature to be changed by having knob 12 rotated in a direction. In other words, by turning knob 12, the temperature can be changed at will.

In like manner, by pressing knob 12 to select a function of sound level control, the sound level can be changed at will by using same knob 12. Thus, by using the described switch assembly, multiple functions of on-vehicle equipment can be controlled with a smaller number of switch devices.

Meanwhile, there is a need for making switch controlling of multiple functions while a driver is driving an automobile vehicle. Under such conditions, it is not necessarily so, for the sake of traffic safety, that the operator can control the functions by visually recognizing the switches. Therefore, there is a need for input devices enabling the driver to have control command signals input therethrough safely and certainly even without looking at the switches.

In the above mentioned switch assembly, the number of switches are not so large that the cases are rare in which the driver is puzzled or makes mistakes in manipulating them. However, knob 12 is completely circular in shape and the driver makes inputting of the driving direction by means of a rotary encoder. Since the rotary encoder freely rotates 360°, it is impossible for the driver to know what the currently set value is only by touching the switch. This means that the driver is required to look at display 13. Although such an advantage can be obtained that the number of switches is reduced, the driver is unable to make the control with his or her eyes turned away from the switches. Thus, it is impossible for the driver to manipulate the switch safely and certainly only with the touch of a hand on the switch.

SUMMARY OF THE INVENTION

Input device of the present invention has a plurality of dials, a driving portion for moving the dials, a dial selecting portion, and a controller. The dial selecting portion receives an input to make a selection from the plurality of dials. The controller controls the driving portion such that the dial selected by the input supplied to the dial selecting portion is moved to a predetermined position.

DETAILED DESCRIPTION OF THE INVENTION

Figure 1:
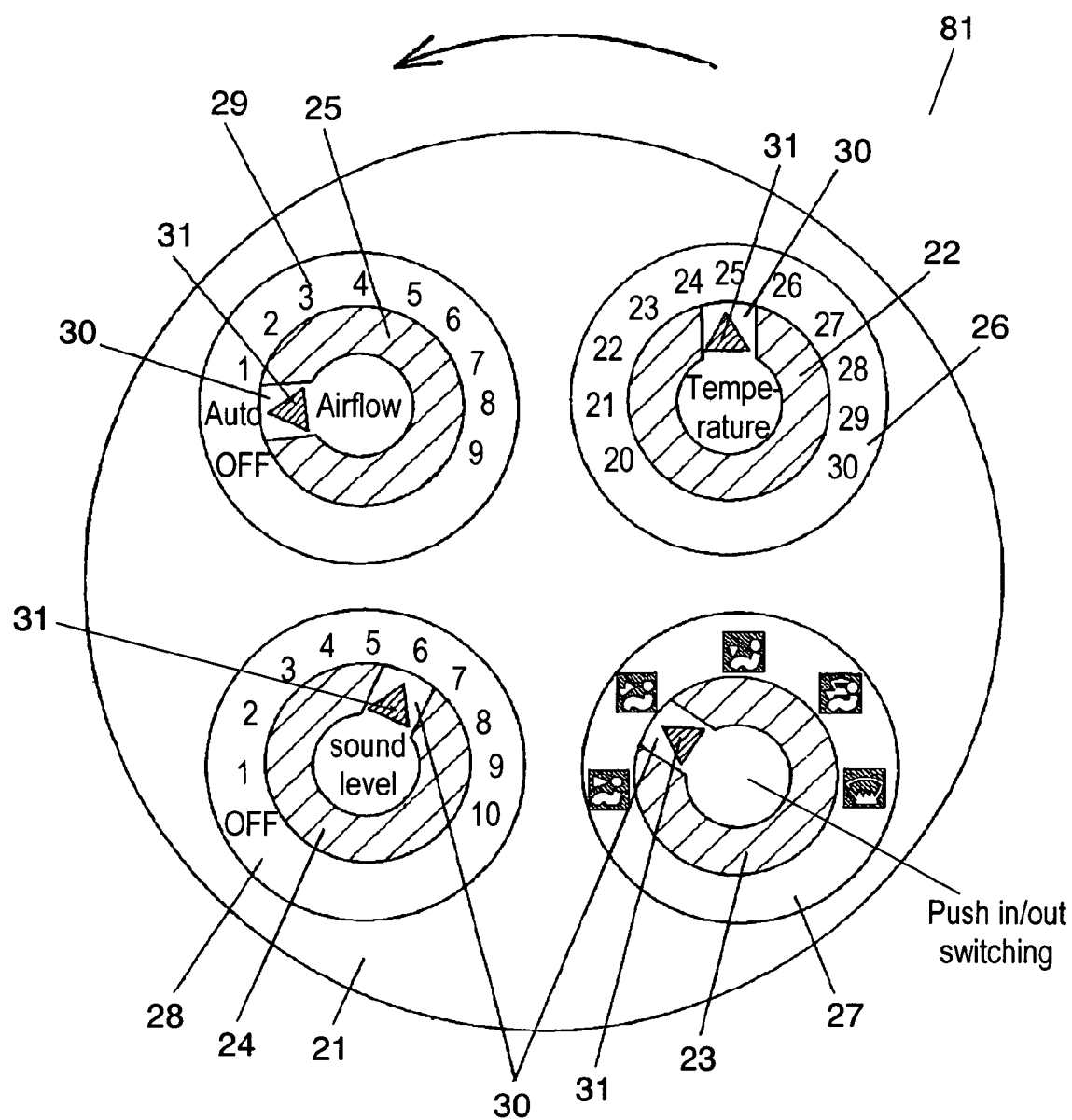
FIG. 1 is a schematic front view of an input device as an exemplary embodiment of the present invention in its state having selected a temperature setting dial.
Figure 2:
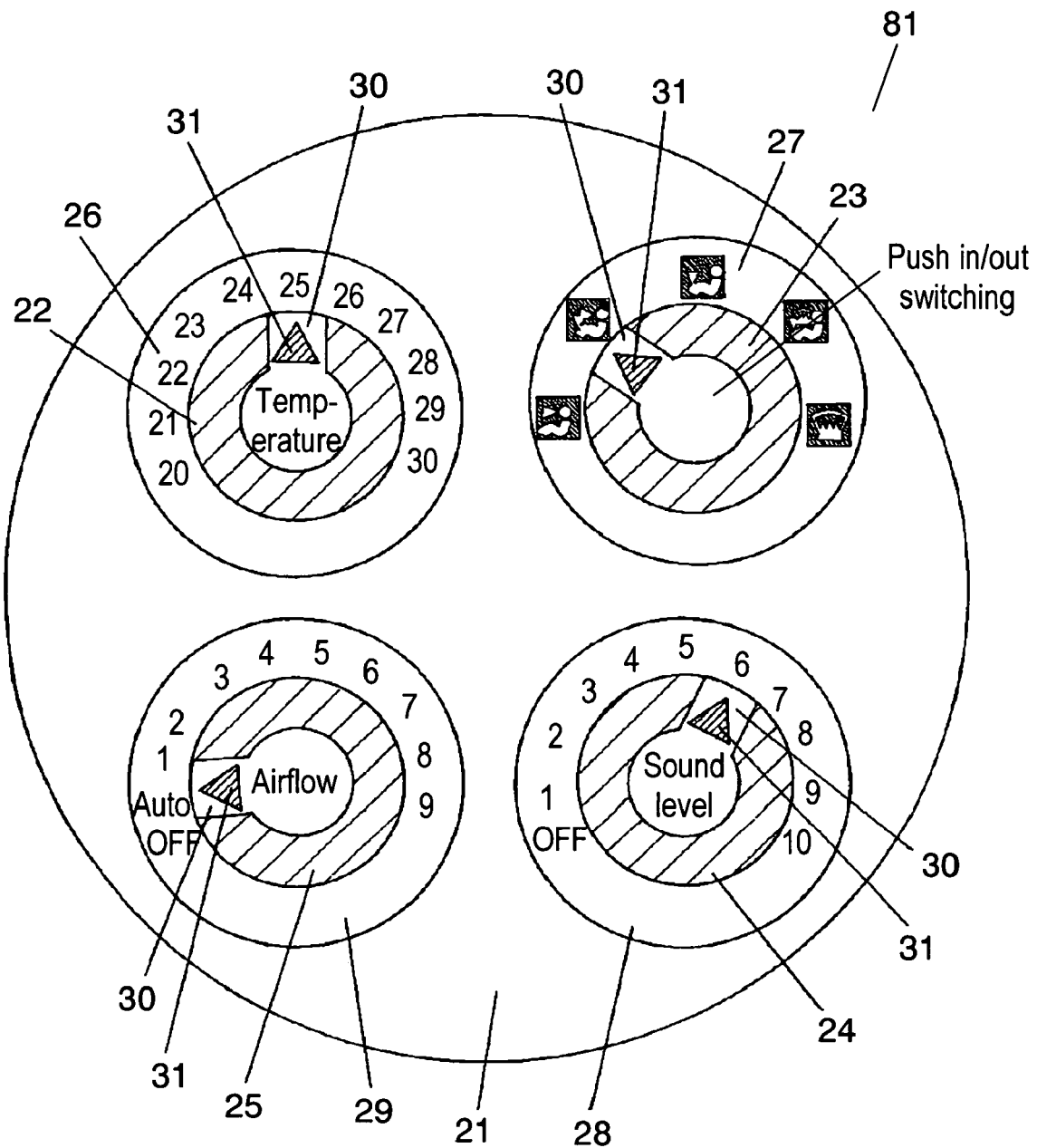
FIG. 2 is a schematic front view of the same input device in its state having selected air vent switching control.
Figure 3A:
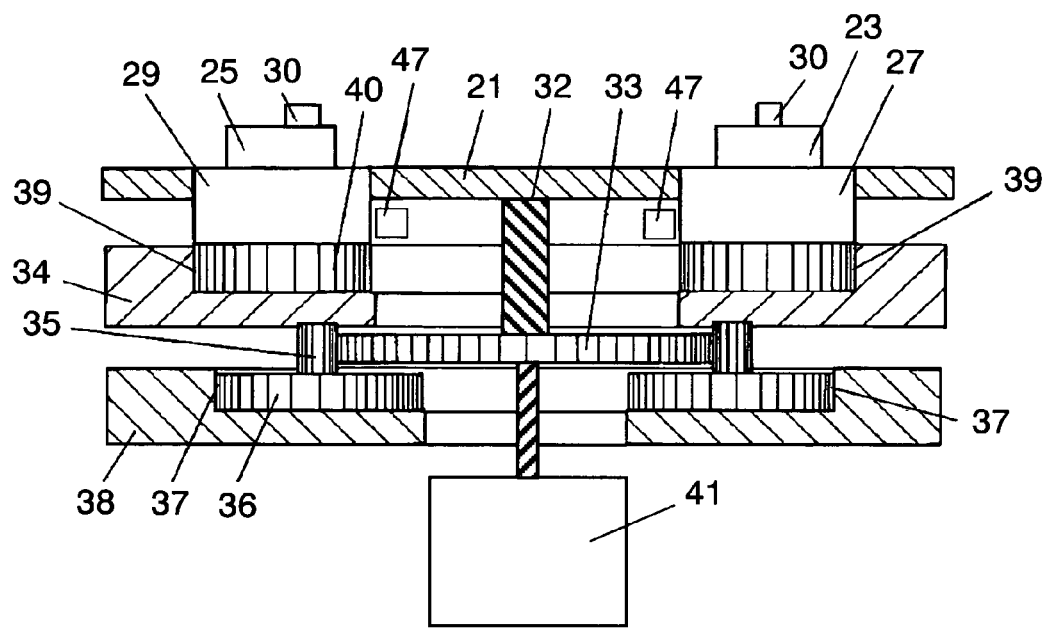
FIG. 3A is a schematic sectional view showing the surroundings of a rotary plate of the input device of FIG. 1.
Figure 3B:
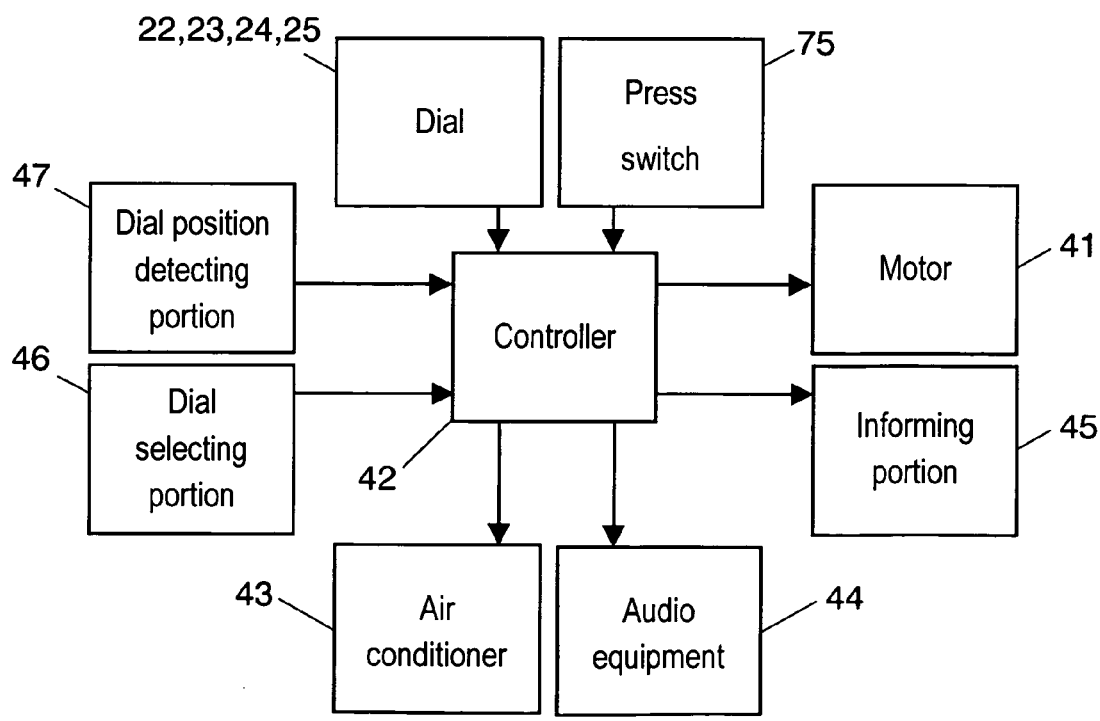
FIG. 3B is a block diagram showing the input device and vehicle-mounted equipments of FIG. 1.
Figure 4:
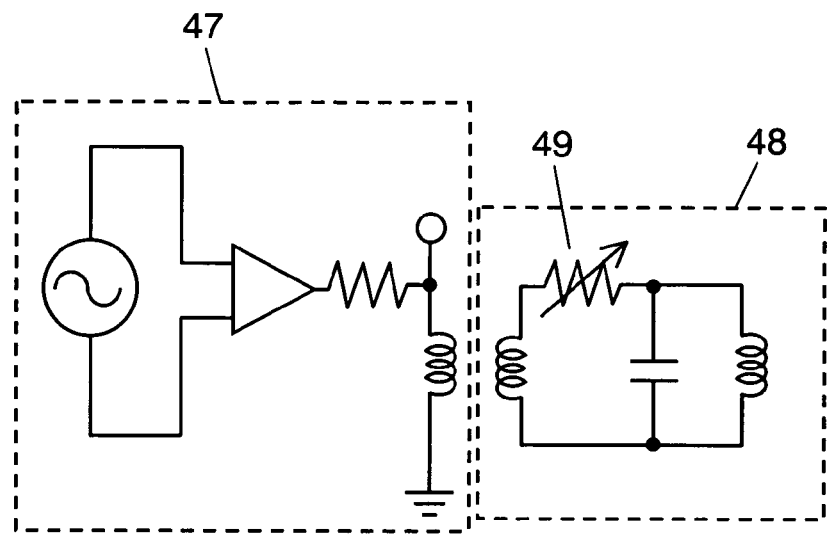
FIG. 4 is a circuit diagram for transmitting a dial position signal in the input device of FIG. 1.
Figure 5:
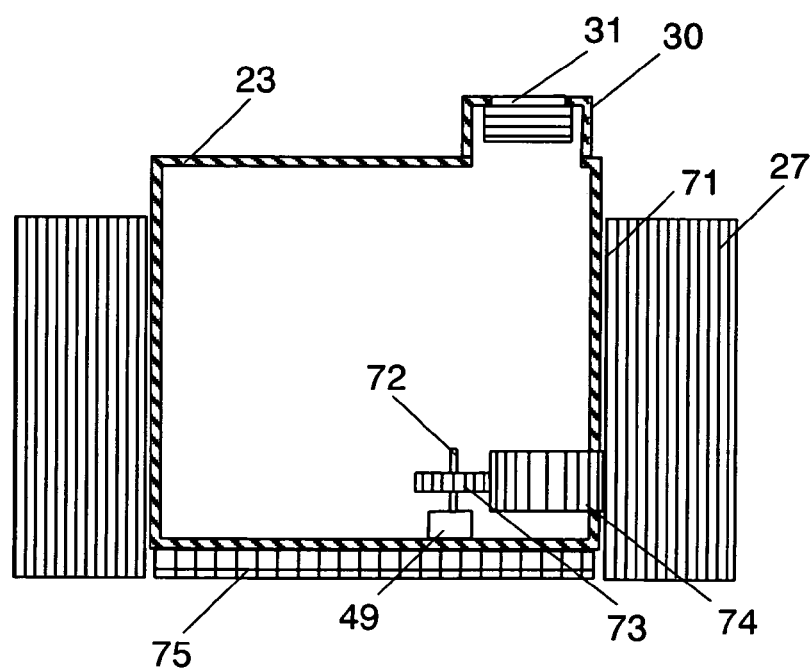
FIG. 5 is a schematic sectional view showing surrounding of a dial in the input device of FIG. 1.

FIG. 1 is a schematic front view of an input device as an exemplary embodiment of the present invention in its state having selected a temperature setting dial. FIG. 2 is a schematic front view of the same input device in its state having selected an air vent switching dial. FIG. 3A is a schematic sectional view showing the surroundings of a rotary plate of the input device. FIG. 3B is a block diagram showing the input device and vehicle-mounted equipments. FIG. 4 is a circuit diagram for transmitting a dial position signal in the input device. FIG. 5 is a schematic sectional view showing details of a dial on the input device.

Rotary disk 21 is provided with dials 22, 23, 24 and 25. By this arrangement, each of a plurality of the dials can be easily shifted to a predetermined position. Dial 22 for setting the temperature of the air conditioner is disposed on the inner side of display plate 26 displaying temperatures. Dial 23 for setting the air vent of the air conditioner is disposed on the inner side of display plate 27 displaying air vents. Dial 24 for setting the sound level of the audio equipment is disposed on the inner side of display plate 28 displaying sound levels. Dial 25 for setting the air flow of the air conditioner is disposed on the inner side of display plate 29 displaying air flows. Display plates 26, 27, 28 and 29 are arranged to be oriented in a fixed direction regardless of the angular positions of rotary disk 21. On the underside of dial 23, there is provided press switch (hereinafter called "switch") 75. A press on dial 23 actuates switch 75. Otherwise, switch 75 may be disposed on the top side of dial 23 so as to be actuated directly.

Protrusions 30 are provided at a portion of dial 22, 23, 24 and 25 in their diametrical directions. Light emitting portions 31 are provided at a portion of dial 22, 23, 24 and 25, which are turned on to allow a passenger at the front passenger seat to operate the input device with ease when it is dark inside the automobile while the driver drives the automobile with the headlights on. Otherwise, the light is automatically turned on when it becomes dark. This also minimizes the time required for the driver to move his or her line of sight and, hence, contributes to improvement in safety. Light emitting portion 31, made of a light emitting diode, lamp, or fluorescent member, is a first angle indicator indicating the angle of the dial with respect to the display plate.

Shaft 32 has its one end connected with rotary plate 21 and the other end with gear 33. One end of gear 35 is rotatably coupled with annular member 34 provided with internal gear 39. The other end of gear 35 is connected with gear 36. Annular member 38 fixed to the automobile vehicle (not shown) has internal gear 37 in meshing engagement with gear 36. Further, gear 33 is in meshing engagement with gear 35. When gear 33 is rotated, its rotation is transmitted to gear 36 through gear 35. Since internal gear 37 is in meshing engagement with gear 36 and member 38 is fixed, the aforesaid rotation causes member 34 to rotate beneath rotary plate 21 coaxially with rotary plate 21.

Gear 40 connected with display plate 29 is in meshing engagement with internal gear 39 of member 34. Because of rotating of member 34 with internal gear 39 thereof in meshing engagement with gear 40, display plate 29 moves with its orientation kept fixed when rotary plate 21 rotates. Rotary mechanism made up of a combination of such gears as gears 33, 35, 36 and 40 and members 34 and 38 having internal gears 37 and 39 is operated by power of motor 41, an only one driving portion. In this arrangement, the dial and the display plate are allowed to move by means of a small number of members.

Display plates 26, 27 and 28 also move with their orientations kept fixed by similar mechanism. Dials 22, 23, 24 and 25 on display plates 26, 27, 28 and 29 also move with their orientations kept fixed.

Motor 41, coupled with shaft 32, is a driving portion for rotating rotary plate 21 to move dials 22, 23, 24 and 25. Controller 42 is connected with dials 22, 23, 24 and 25 and press switch 75. Controller 42 is also connected with motor 41, air conditioner 43, audio equipment 44, informing portion 45, dial selecting portion 46, and dial position detecting portion (hereinafter called "detector") 47. According to the circumstances, controller 42 controls air conditioner 43, controls audio equipment 44, updates images displayed by informing portion 45, and controls motor 41.

Further, display plates 26, 27, 28 and 29 each has circuit 48 incorporated therein. The resistance value of each resistor 49 included in circuit 48 is adapted to vary with the position of dial 22, 23, 24 and 25 with respect to each display plate 26, 27, 28 and 29. To be concrete, as shown in FIG. 5, for example, internal gear 71 is provided on display plate 27 and internal gear 71 is arranged in meshing engagement, via reduction gear 74, with gear 73 provided on operating shaft 72 of resistor 49 made of a variable resistor. The other display plates and dials are arranged in like manner. Each detector 47 disposed adjacent to dial 22, 23, 24 and 25 detects the change in the resistance value of resistor 49 through intercoil coupling. Thus, detector 47 detects a dial position in a noncontact manner and inputs it to controller 42. Input device 81 is configured as described above.

Figure 6:
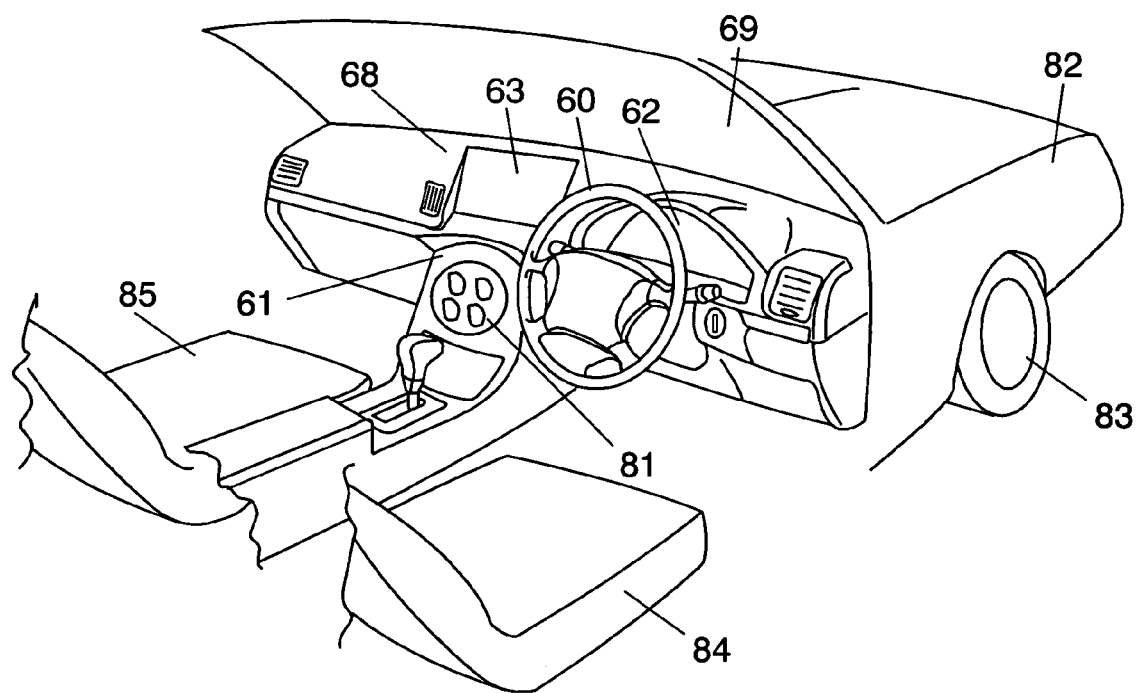
FIG. 6 is a partially-cutaway schematic diagram of a vehicle showing the input device of FIG. 1 mounted at an upper position of a center console.

Below will be described a manner of mounting the input device on a vehicle. FIG. 6 schematically shows the state of input device 81 mounted on a vehicle. Steering wheel 60 for steering the vehicle is provided inside car body 82 supported on drive wheels 83. Forwardly of steering wheel 60, there is provided meter panel 62 and, between driver's seat 84 and front passenger seat 85, there is provided center console 61. Input device 81 is provided at the upper portion of center console 61.

Figure 7:
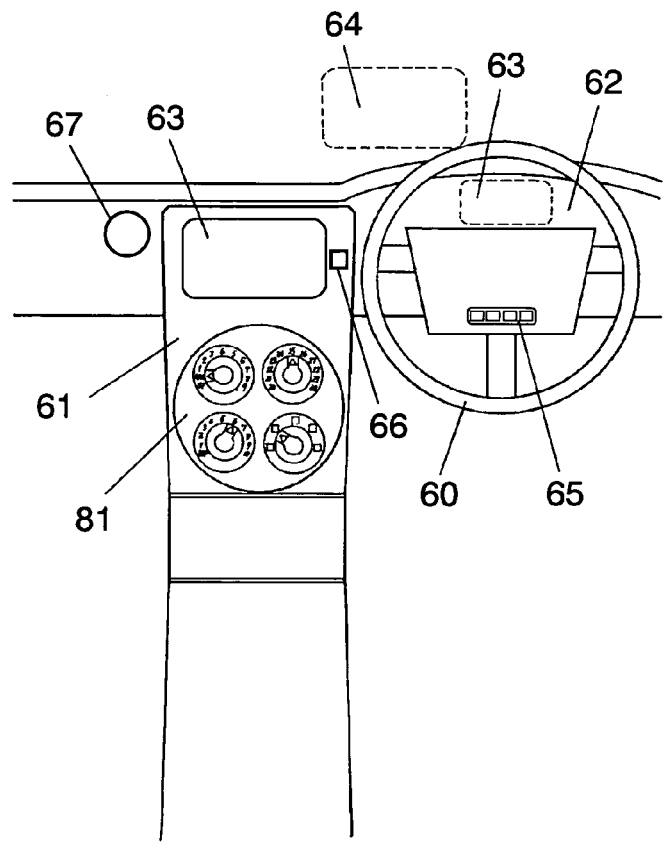
FIG. 7 is a schematic diagram showing surroundings of the center console in FIG. 6.
Figure 8:
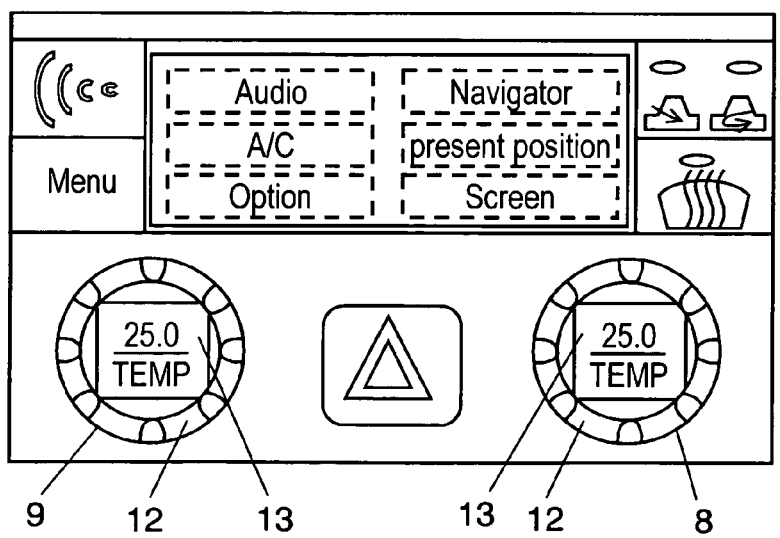
FIG. 8 is a front view of a conventional input device.

FIG. 7 schematically shows the surroundings of the driver's seat. There is shown a state where input device 81 is provided at the upper portion of center console 61 and dial selector 46 receives an input from steering switch 65 provided at a portion of steering wheel 60. This arrangement makes inputting from the driver to dial selector 46 easy and allows the driver to make selection of a function by a small stroke of finger movement even while driving the vehicle. Informing portion 45 for notifying the driver of the result of operation of input device 81 and the present status of the same allows images and characters to be displayed on display portion 63 made of a display. Display portion 63 is installed either at meter panel 62 or at the upper portion of center console 61. Since display portion 63 is located near windshield 69, the driver is enabled to verify the present status with a minimum movement of his or her line of sight while driving and this improves safety driving. In order to obtain better viewability, head-up display 64 on which images are projected may be provided at a portion of windshield 69 as the display portion.

Operation of input device 81 having the above-described configuration will be described below.

FIG. 1 is a schematic diagram showing input device 81 when the driver, while driving a vehicle with a right-hand steering wheel, has selected a temperature setting function with the use of dial selector 46. At this time, dial 22 for the temperature setting is located at a predetermined position nearest to steering wheel 60. In the case of FIG. 1, dial 22 is located at the upper right. Therefore, the driver is at a position easy to operate dial 22 and hence enabled to move his or her hand off steering wheel 60 and touch and operate dial 22 at once.

If it is desired here to switch the air vents, a command signal therefor is transmitted to controller 42 by a press on an air vent switch at dial selector 46. Controller 42 causes motor 41 to operate so that dial 23 for setting up air vents is shifted to the position nearest to the driver as shown in FIG. 2.

At this time, rotary plate 21 is rotated 90° by means of gear 33 and shaft 32 to the left as indicated by the arrow in FIG. 1, whereby display plates 26, 27, 28 and 29 and dials 22, 23, 24 and 25 are shifted in leftward rotating direction. Since rotary plate 21 is brought to a predetermined position fastest after the dial selection, the time for the driver to wait for completion of the rotation is reduced.

Display plates 26, 27, 28 and 29 move without changing orientations of characters and graphics as viewed from the driver. Dials 22, 23, 24 and 25 also move without changing orientations of characters and pointed positions. Therefore, dials other than that in the predetermined position can be operated with their attitude kept the same as taken by each dial in the predetermined position. Further, it will not occur that a passenger at front passenger seat 85 feels difficulty in identifying them and makes an error in finding the position of protrusion 30. Such merits can be obtained by virtue of rotary mechanism composed of gears 35, 36 and 40, internal gears 37, 39, and membes 34, 38.

Since dials 22, 23, 24 and 25 are provided with protrusions 30, respectively, the driver is enabled to identify which position each of the dial is now pointing without visually recognizing it but by just touching the protrusion. Further, the driver is enabled to change the setting as desired by touching each of the dials. More specifically, protrusion 30 is a second angle indicator allowing the driver to know the angle of the dial with respect to the display plate through the sense of touch. The second angle indicator may otherwise be provided in the form of a recess.

At the same time, informing portion 45 displays a newly set item of control by means of display portion 63 or headup display 64. By the described arrangement, the result of control can be more easily recognized while the automovile is stopped or by the passenger at front passenger seat 85.

Otherwise, it may be arranged such that press switch 75 is actuated by pressing dial 23 and thereby switching may, for example, be made between introduction of outside air and circulation of inside air. Further, other dials may also be provided with press switch 75 so that corresponding function is performed using the same. By virtue of such arrangement, even when there are too many alternatives in setting up a function and hence selection thereof is unattainable only by the use of a dial, the selection can be flexibly made by actuating switch 75.

The case where a temperature setting function is switched to an air vent setting function is described above, the same can be said of other cases where the setting is changed to that of other function.

Although, in the case of the present embodiment, an example in which dial selector 46 receives an input from steering switch 65 is described, dial selection may also be made by means of voice recognition. For example, when it is desired to change air vents, the driver speaks "air vent" into microphone 66 installed within the automobile. In response thereto, controller 42 activates motor 41 so that rotary plate 21 is rotated and dial 23 is shifted to the predetermined position. Thereby, the need for operating steering switch 65 can be eliminated and one searching motion by hand is reduced. Although it may be considered to have commands for all the functions input by voice recognition, it is difficult to have a large number of words recognized by the present technology. Therefore, when voice recognition is to be used, its application may preferably be limited to limited words as used in dial selection.

In the present embodiment, informing portion 45 allows operated results of dials 22, 23, 24 and 25 to be displayed. Instead of that, operation results may be announced by a voice output from voice output portion 67 formed of a speaker provided within the automobile. In this case, the need for checking the operation results on the screen is eliminated and hence safety is further improved.

In the present embodiment, description is made about an example using a rotary mechanism. However, other mechanisms may be used if dials 22, 23, 24 and 25 and display plates 26, 27, 28 and 29 can be kept oriented in fixed directions by the use of the same.

In the present embodiment, the predetermined position where one of dials 22, 23, 24 and 25 is disposed is described to be at the upper right of rotary plate 21. However, it may be changed to the upper left position in the case of a vehicle with a left-hand steering wheel or it may be arranged to be changeable to any position that suits to the preference of users.

Although, as the method for inputting positional information of dial 22, 23, 24 and 25 to controller 42, detector 47 detects the position by means of coupling between coils in the present embodiment, another non-contact method or contact method may be used.

In the present embodiment, controller 42, dial selecting portion 46 and informing portion 45 are provided separately. Since they are formed of microprocessors, two or more of them may be formed in one piece.

Although, in the present embodiment, only air conditioner 43 and sound level control of audio equipment 44 are mentioned as examples of the equipment to be controlled with dials, such functions as control of other functions of the audio equipment or control of car navigation equipment may be added by increasing the number of dials.

Although an example in which all the dials are provided with angle indicators is described in the present embodiment, some dials may not be provided with any angle indicator. Dial 24, for example, is for controlling the sound level and the sound level can be acknowledged through the sense of hearing. Hence, the angle indicator therefor may be omitted.

The input device according to the present invention moves a dial selected by the driver to a predetermined position near the steering wheel. Therefore, the need can be eliminated for the driver to search for a dial to be controlled by moving his or her line of sight. Since the driver is enabled to set a dial without looking at it, the input device of the invention is specifically useful for a vehicle in which setting of a dial is required without looking at the input device.

What is claimed is:

1. Input device comprising:
    a plurality of dials;
    a driving portion for moving the plurality of dials;
    a dial selecting portion for receiving an input to make a selection from the plurality of dials; and
    a controller for controlling the driving portion such that the dial selected by the input supplied to the dial selector is moved to a predetermined position.

2. The input device according to claim 1, further comprising a rotary plate having the plurality of dials disposed thereon, wherein
    the driving portion rotates the rotary plate.

3. The input device according to claim 2, wherein
    the rotary plate rotates in such a direction that the selected dial takes the shortest distance to reach the predetermined position.

4. The input device according to claim 2, further comprising a rotation mechanism for rotating the plurality of dials such that orientations of the plurality of dials are kept fixed regardless of rotational angles of the rotary plate.

5. The input device according to claim 4, wherein
    the rotation mechanism is made up of a combination of a plurality of gears operated by a power from the driving portion.

6. The input device according to claim 1, wherein
    at least one of the dials has an angle indicating portion showing an angle of the dial.

7. The input device according to claim 6, wherein
    the angle indicating portion allows the angle of the dial to be known through a sense of touch.

8. The input device according to claim 6, wherein
    the angle indicating portion is one of a protrusion and a recess provided in a diametrical direction of the dial.

9. The input device according to claim 6, wherein
    the angle indicating portion is a light emitting portion.

10. The input device according to claim 1, further comprising a press switch disposed on one of:
   (1) at least one of undersides of the plurality of dials, and
   (2) at least one of upper sides of the plurality of dials.

11. The input device according to claim 1, further comprising an informing portion for informing of results of operation of the selected dial.

12. The input device according to claim 11, further comprising a press switch disposed on one of:
   (1) at least one of undersides of the plurality of dials, and
   (2) at least one of upper sides of the plurality of dials, wherein
   the informing portion informs of results of operation of the press switch.

13. The input device according to claim 1, wherein
   the dial selecting portion selects one of the plurality of dials through a voice recognition input.

14. A vehicle comprising:
   a car body;
   a driving wheel for supporting the car body thereon; and
   an input device installed inside the car body comprising:
      a plurality of dials;
      a driving portion for moving the plurality of dials;
      a dial selecting portion for receiving an input to make a selection from the plurality of dials; and
      a controller for controlling the driving portion such that the dial selected by the input supplied to the dial selector is moved to a predetermined position.

15. The vehicle according to claim 14, further comprising a steering wheel provided in the car body, wherein the predetermined position is a position closest to the steering wheel.

16. The vehicle according to claim 14, wherein
   the input device further comprises:
      an informing portion for informing results of operation of the selected dial; and
      a display portion for displaying information from the informing portion, wherein
   the display portion is at least one of
   (1) a display disposed on one of a meter panel provided within the car body and a dashboard provided within the car body, and
   (2) a headup display arranged to have information from the informing portion displayed on a windshield fixed to the car body.

17. The vehicle according to claim 14, wherein
   the input device further comprises:
      an informing portion for informing of results of operation of the selected dial; and
      a voice output portion for informing of information from the informing portion by voice.

18. The vehicle according to claim 14, further comprising a steering wheel including a steering switch, wherein
   the dial selecting portion selects one of the plurality of dials upon receipt of an input from the steering switch.

* * * * *